US011146604B2

(12) United States Patent
Havekes et al.

(10) Patent No.: US 11,146,604 B2
(45) Date of Patent: Oct. 12, 2021

(54) CONTENT DISTRIBUTION SYSTEM

(71) Applicant: Koninklijke KPN N.V., The Hague (NL)

(72) Inventors: Anton Havekes, Schiedam (NL); Peter-Jan Doets, Vlaardingen (NL); Victor Klos, The Hague (NL); Robert-Enrst Kooij, Delft (NL); Martin Prins, The Hague (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 15/943,930

(22) Filed: Apr. 3, 2018

(65) Prior Publication Data

US 2018/0248925 A1   Aug. 30, 2018

Related U.S. Application Data

(63) Continuation of application No. 13/516,894, filed as application No. PCT/EP2010/070242 on Dec. 20, 2010, now abandoned.

(30) Foreign Application Priority Data

Dec. 21, 2009   (EP) .................................... 09180200

(51) Int. Cl.
H04N 21/24        (2011.01)
H04N 21/466       (2011.01)
(Continued)

(52) U.S. Cl.
CPC .......... H04L 65/4084 (2013.01); H04L 65/80 (2013.01); H04N 21/2402 (2013.01);
(Continued)

(58) Field of Classification Search
CPC ........... H04N 21/4668; H04N 21/4826; H04N 21/64738; H04N 21/4828; H04N 21/2402;
(Continued)

(56) References Cited

U.S. PATENT DOCUMENTS 7,593,686 B1    9/2009  Knoop
2002/0087713 A1* 7/2002  Cunningham ........ H04L 47/822
                                        709/235
(Continued)

OTHER PUBLICATIONS

PCT International Search Report and Written Opinion, PCT International Application No. PCT/EP2010/070242 dated Feb. 16, 2011.
(Continued)

Primary Examiner — David R Lazaro
Assistant Examiner — Xiang Yu
(74) Attorney, Agent, or Firm — McDonnell Boehnen Hulbert & Berghoff LLP

(57) ABSTRACT

A content distribution system is provided comprising a content client and a content server connected through a network. The content server is configured to send the content client a session description comprising at least one media description to enable it to receive over the network a content item. The system comprises a network monitor for monitoring network traffic going through the network, and a recommender for marking in dependency upon the network monitor, one or more of the media descriptions in the session description to obtain a marked session description. The marked media description recommends the content client to prefer certain content above others in view of the current network condition. For example, if available bandwidth is low, content is recommended which requires low bandwidth. Network congestion is thereby avoided for all users of the system.

7 Claims, 5 Drawing Sheets

(51) Int. Cl.
  *H04N 21/472* (2011.01)
  *H04N 21/647* (2011.01)
  *H04N 21/482* (2011.01)
  *H04L 29/06* (2006.01)
  *H04L 29/08* (2006.01)

(52) U.S. Cl.
  CPC ....... *H04N 21/4668* (2013.01); *H04N 21/472* (2013.01); *H04N 21/4826* (2013.01); *H04N 21/64738* (2013.01); *H04L 67/28* (2013.01); *H04L 67/322* (2013.01)

(58) Field of Classification Search
  CPC ....... H04N 21/47202; H04N 21/47205; H04N 21/47208; H04N 21/47211; H04N 21/482; H04L 65/4084; H04L 65/80; H04L 67/28; H04L 67/322
  See application file for complete search history.

(56) References Cited

U.S. PATENT DOCUMENTS

| | | | |
|---|---|---|---|
| 2002/0089928 A1 | 7/2002 | Morikawa et al. | |
| 2003/0016630 A1 | 1/2003 | Vega-Garcia et al. | |
| 2008/0195664 A1* | 8/2008 | Maharajh | H04L 67/306 |
| 2009/0185619 A1* | 7/2009 | Taleb | H04N 21/2368 375/240.02 |
| 2010/0325666 A1* | 12/2010 | Wiser | H04N 21/6338 725/44 |
| 2011/0214148 A1* | 9/2011 | Gossweiler, III | H04N 21/6587 725/46 |

OTHER PUBLICATIONS

European Search Report, European Patent Application No. 09180200.9 dated Jun. 9, 2010.

Alcuri, Luigi et al., "Congestion Avoidance Using DYnamic COdec MAnagement: A Solution for ISP", Asia-Pacific Conference on Communications, Perth, Western Australia, Oct. 3-5, 2005, pp. 886-890.

Mingardi, Chiara et al., "IPTV Quality of Service Management in Home Networks", 2009 IEEE International Conference on IEEE, Piscataway, NJ, Jun. 14, 2009, 5 pages.

Handley, M. et al., "SDP: Session Description Protocol", Network Working Group, Request for Comments 4566, Jul. 2006, pp. 1-46.

Rosenberg, J. et al., "An Offer/Answer Model With the Session Description Protocol (SDP)", Network Working Group, Request for Comments 3264, Jun. 2002, pp. 1-24.

Case, J. et al., "A Simple Network Management Protocol (SNMP)", Network Working Group, Request for Comments 1157, May 1990, pp. 1-34.

McCloghrie, K., et al., "Structure of Management Information Version 2 (SMIv2)", Network Working Group, Request for Comments 2578, Apr. 1999, pp. 1-43.

Harrington, D. et al., "An Architecture for Describing SNMP Management Frameworks", Network Working Group, Request for Comments 2571, Apr. 1999, pp. 1-58.

Korean Notice of Office Action (and translation), Korean Application No. 10-2012-7017359, dated Nov. 21, 2013.

"Series H: Audiovisual and Multimedia Systems, Infrastructure of Audiovisual Services—Coding of Moving Video, Advanced Video Coding for Generic Audiovisual Services", ITU-T Telecommunication Standardization Sector of ITU, H.264, Mar. 2009, pp. 1-670.

Strauss, Jacob et al., "A Measurement Study of Available Bandwidth Estimation Tools", MIT Computer Science and Artificial Intelligence Laboratory, IMC, Oct. 27-29, 2003, Miami Beach, Florida, 6 pages.

Handley, M. et al., "SOP: Session Description Protocol", Network Working Group, Request for Comments 2327, Apr. 1998, pp. 1-40.

* cited by examiner

300

```
v=0
o=alice 2890844526 2890844526
IN IP4 host.anywhere.com
s=examplesession
c=IN IP4 host.anywhere.com
t=0 0
a=recvonly
a=type:broadcast
```

310
```
m=audio 0 RTP/AVP 96
b=AS:32
a=3GPP-Adaptation-Support:1
a=rtpmap:96 MP4A-LATM/32000
a=fmtp:96 profile-level-id=15;
object=2; cpresent=0;
config=400025103fc0
```

320
```
m=audio 0 RTP/AVP 97
b=AS:64
a=3GPP-Adaptation-Support:1
a=rtpmap:97 MP4A-LATM/32000
a=fmtp:97 profile-level-id=15;
object=2; cpresent=0;
config=400025103fc0
```

```
v=0
o=alice 2890844526 2890844526
IN IP4 host.anywhere.com
s=examplesession
c=IN IP4 host.anywhere.com
t=0 0
a=recvonly
a=type:broadcast
```

325 ── `a=recomsessionbw:32`

310
```
m=audio 0 RTP/AVP 96
b=AS:32
a=3GPP-Adaptation-Support:1
a=rtpmap:96 MP4A-LATM/32000
a=fmtp:96 profile-level-id=15;
object=2; cpresent=0;
config=400025103fc0
```

320
```
m=audio 0 RTP/AVP 97
b=AS:64
a=3GPP-Adaptation-Support:1
a=rtpmap:97 MP4A-LATM/32000
a=fmtp:97 profile-level-id=15;
object=2; cpresent=0;
config=400025103fc0
```

Figure 3b

CONTENT DISTRIBUTION SYSTEM

CROSS REFERENCE TO RELATED APPLICATIONS

The present application is a continuation of, and claims priority to, U.S. application Ser. No. 13/516,894 filed on Jun. 18, 2012, which is a national stage entry of, and claims priority to, PCT/EP2010/070242, filed Dec. 20, 2010, which claims priority to European Patent Application EP 09180200.9, filed in the European Patent Office on Dec. 21, 2009, all three of which are hereby incorporated in their entirety herein by reference.

FIELD OF THE INVENTION

The invention relates to a content distribution system comprising a content client and a content server, the content client and content server being connected through a network, the content server being configured to send to the content client a session description comprising at least one media description, each one of the at least one media descriptions comprising connection information to enable the content client to receive over the network a content item.

The invention further relates to a gateway for use in a content distribution system.

The invention further relates to a method of distributing content and to a corresponding computer program.

BACKGROUND OF THE INVENTION

The distribution of content is an important function of modern networks. Consider a content client, e.g., a set top box. The content client is connected with one or more content servers through a network, e.g., the Internet. Typically, the content client, possibly together with other content clients connects with the network through a gateway. The gateway allows network devices in the first network access to one or more network devices in the second network.

The content server can provide the content client with content by sending it over the network. Content comprises, e.g., audio, video and/or text, etc. For example, a user may watch a new movie, possibly on-demand by receiving a content stream comprising the movie on his set-top box and displaying the movie on a television screen. Different protocols are in use to send content over a network, e.g., file transferring protocols, streaming protocols, etc.

It may happen that a particular content item is available in multiple formats. For example, the user who wishes to watch the new movie may request the movie from the content server. The content server could then respond with a session description listing multiple options for the same movie. The content server may offer the movie in multiple versions, e.g., with additional features, for example, with an alternative audio track, such as a commentary track, additional subtitles, etc. The content, in any of its versions, may be available in multiple formats having different bandwidth requirements. For example, different bandwidth requirements may be obtained by offering the movie in multiple resolutions, e.g., in a high definition format suitable for high definition television screens, in a medium definition format suitable for non-high definition television screen, or in a low definition format suitable for low resolution devices, e.g., mobile phone screens. Typically, a higher definition device is capable of displaying a lower definition version of the content. In general, bandwidth may be represented as a number, e.g., kilobits per second.

The session description comprises a list of media descriptions. A media description comprises information needed by a content client to start receiving the content item.

The Internet Engineering Task Force (IETF) has published a 'request for comments' (RFC), RFC 2327, later updated to 4566, titled 'SDP: Session Description Protocol'. RFC 4566 discloses one way in which sessions descriptions and media descriptions may be implemented. RFC 4566 describes the session description protocol (SDP). The protocol comprises a standard representation of session descriptions comprising media descriptions.

RFC 4566 SDP is intended to be general purpose so that it can be used for a wide range of network environments and applications. However, RFC 4566 does not support negotiation of session content or media encodings. A SDP session may contain multiple alternatives offered by the server that a client may choose from. For instance the service offers audio in multiple audio formats. The client will then select a format he supports. This selection can for instance be provided by means of RTSP setup messages. RFC 4566 session descriptions may be conveyed over the network or alternative means of conveying session descriptions may be used, including electronic mail and the World Wide Web. SDP conveys information about media streams in multimedia sessions to allow the recipients of a session description to participate in the session.

To this end an RFC 4566 session description may include such information as, the type of media video, audio, etc, the transport protocol (RTP/UDP/IP, H.320, etc), the format of the media (H.261 video, MPEG video, etc), etc. In particular, a media description may include bandwidth information and connection information.

When the session description is received on a content client, any of the media descriptions can be selected and the corresponding content item may be received on the content client.

However, for a user of the content client it is not always clear which one he should choose. Different media descriptions may be associated with different media which may have different bandwidth requirements. Selecting content with appropriate bandwidth requirement is important. If content is selected with a bandwidth requirement which is too low, then it is probably also of lower quality and the resulting user experience will correspondingly worsen. On the other hand a bandwidth requirement which is too high will result in network congestions, and dropped frames. In other words, both choosing to low and choosing to high a bandwidth will lead to a low perceived quality, either through low resolution or compressions artifacts, or through network congestion and dropped frames.

Getting the correct bandwidth is often done using a trial and error approach. A trial and error approach may involve setting up a session with a maximum bandwidth, and once congestion occurs, reduce the session bandwidth until an acceptable quality is obtained.

SUMMARY OF THE INVENTION

It is a problem of the prior art that selection from a list of multiple content versions on the basis of bandwidth requirements is hard.

To better address this concern, an improved content distribution system is provided. The content distribution system comprises a content client and a content server.

The content client and content server are connected through a network. The content server is configured to send to the content client a session description comprising at least one media description possibly upon request of a content client. Each one of the at least one media description comprises connection information to enable the content client to receive over the network a content item. The system comprises a network monitor for monitoring network traffic going through the network. The system comprises a recommender configured to mark in dependency upon the network monitor, one or more of the multiple media descriptions in the session description to obtain a marked session description. The recommender is configured to send the marked session description to the content client.

Each specific connection information may enable the content client to receive over the network a specific content item. Possibly all specific content items referred to by media descriptions in a session description may be different. Possibly, some or all of the referred to content items may be equal and may, e.g., be offered in a different transmission protocol.

When a content client receives a session description comprising a media description he has the option of using that media description to make a connection over the network, e.g., to the content server or to some further content server, and receive the content item referred to in the media description. It is of advantage to the user to have an idea in advance whether making this connection will be worthwhile. However the user is not always in the best position to make this judgment. In particular, if information based on network traffic plays a role the user is at a disadvantage, since he has at best only a vague idea of his own network traffic, and has no knowledge of network traffic caused by other, e.g., other content clients on the network.

Since the system has a network monitor such information can be added to the session description, by adding appropriate marking. For example, by recommending some of the media description. Recommending may be recommending in favor or recommending against. Multiple marks may be used. Marking may be explicit or implicit.

Examples of the type of information that may be used and which may be derived from past network traffic include, bandwidth availability, consumed bandwidth so far. But also estimation of bandwidth requirement, which may also be base on past network traffic.

Even if the session description contains only one media description the recommendation is useful, since a user may prefer not to receive content at all, rather then having to sit through content which is inappropriate given the network traffic. The session description may also comprise multiple media descriptions.

In an embodiment, the session description comprises multiple media descriptions. In a session description wherein multiple media descriptions are available the recommender can recommend one of the media descriptions above the others.

In an embodiment, the content distribution system comprises a gateway. The network comprises a first and second network. The content client and the gateway are connected through the first network. The gateway and the content server are connected through the second network. Each one of the connection information enables the content client to receive over the first and second network and through the gateway the content item. The gateway comprises the network monitor for monitoring network traffic going through the gateway between the first network and second network.

A gateway is situated at a convenient place to collect network information, since all of the network traffic between the first and the second network passes the gateway.

The recommender may mark using the gateway by sending a recommendation to the gateway. Upon receiving the recommendation the gateway may perform the marking.

One factor which complicates the selection from multiple media descriptions for the content client, is his restricted view of the network, i.e., of the first and second network. The content client is connected through the first network, i.e., a local network for connecting a content client to a gateway. The first network typically has rather liberal bandwidth restrictions. The first network is typically capable of handling a much larger amount of network traffic than the second network. For example, the second network is typically larger than the first network and hence more likely to contain bandwidth bottle necks. The content's client view of the second network is masked by the large bandwidth of the first network. Moreover, other network devices than the content client may connect to the gateway and consume part of the second network's bandwidth. The content client may not be able to see network traffic on the first network originating from other network devices. The gateway is situated in a location in the network in between the content client and the content server, and for this reason, the gateway has a much better picture of prevailing network conditions. The network monitor is typically external to the content client. The network client may be combined with other network devices, e.g, gateway, router, proxy, firewall, etc.

By giving a recommendation for a particular content version, i.e., a media description, based on the information obtained from the network monitor a more informed choice can be made than if this recommendation were made in dependency on the network information available at the content client or at the content server.

Moreover, the system allows users to voluntarily adjust their bandwidth while consuming services to take other users in the home network into account. These users may be willing to make concessions concerning the usage of bandwidth, for instance a video service, if this means that another user can also view an IPTV channel. An example of such a situation would be a household with multiple IPTV set top boxes.

Bandwidth is only an example of the type of information that can be obtained by the network monitor and which information may be relevant to give a recommendation. For example, the network monitor may also keep track of the total amount of network traffic that flowed through the gateway in a given timeframe. For example, the network traffic caused by the content client and other content clients connected to the same gateway would typically have to be paid for. For example, the operator of the gateway and/or the content client may have a subscription allowing a certain amount of network traffic per time frame, say 5 gigabytes per month. The network monitor can keep track of the amount of consumed network traffic in the current time frame so far. If the amount of network traffic allowed by the subscription is nearing, the recommender may recommend against large content items which require a lot of network traffic. In this way, it can be avoided that more than some predetermined amount of network traffic is exceeded.

Another advantage of the system is that a list of media descriptions can be modified or extended without the need of modifying the content server itself.

The system thus improves the selection of a content version from a list of multiple content versions at a client on the basis of network information obtained at a different location in the network than the client.

The content distribution system may be used to distribute a variety of content types, including video, audio and text content and any combination thereof. The content may also include navigation information, e.g., menu information and/or meta information such as descriptions of other content, tags, author information, etc, such information may be structured in the form of a data structure. The content may be in a variety of formats, e.g., MPEG4, MP3, HTML, etc. The content may be a content stream, intended to be watched as it arrives in the content client, possibly, after some buffering.

The content client may comprise, e.g., a computer, e.g., a desktop computer, a laptop, netbook etc, a set top box, a mobile phone, a PDA, etc.

The gateway may comprise other network related devices, e.g., a firewall, a router etc. In an embodiment, the gateway connects a first network with a second network, wherein the first and the second network share no device or network connections, other than the gateway. On the other hand, it may be possible that a device in the first network is able to communicate with a device in the second network without using the gateway. For example, there may be multiple gateways between the first and second network. For example, out of band communication may be used.

The content server may be a content system, using different computers for different purposes. The content server may comprise a file server for serving the content files. The content server may comprise a web server for requesting a session description.

The content server may comprise a management server for sending the session description to the content client.

The first network may be a home network. The first network may be as simple as a single network connection from the content client to the gateway. On the other hand, it is also possible that multiple content clients in a larger network connect with the gateway, for example, a home network comprising multiple network devices.

The content client and the gateway are connected through a first network. The first network may be an Ethernet network. The first network may comprise a wireless network, e.g., a WiFi network. The gateway and the content server are connected through a second network, e.g., a business intranet, etc.

The second network may comprise the Internet. The second network may comprise a core network and a proprietary access network for connecting multiple gateways and multiple first networks to the core network. The core network may comprise the Internet.

The session description and/or media description may conform to RFC 4566. For example, a session description may conform to Section 5 of RFC 4566. However, it is noted that for the purpose of the invention the terms session description and/or media description are not necessarily restricted to those defined in RFC 4566. For example, a media description may be implemented as an URL and a session description may be implemented as an HTML page listing multiple of those URL's. In that case, the recommender creates a marked HTML page. A session description may be a digital file comprising the multiple media descriptions in a computer readable encoding. The encoding may use characters, such as ASCII characters, which are also suitable for human interpretation. The session description may also use a binary encoding such as Abstract Syntax Notation One (ASN.1) or External Data Representation (XDR), which needs a parsing and/or interpretation step before it may be rendered in a human readable form. A binary encoding has the advantage that the encoding is shorter.

The distribution network is configured such that a session description sent from the content server to the content client is also obtained at the recommender. For example, sending the session description from the content server to the content client may comprise sending the session description from the content server to the gateway. This can be accomplished by sending the session description through the second network and the first network. The gateway can intercept the session description before it reaches the content client, modify the session description and then send the marked session description to the content client to complete the sending of the session description from the content server to the content client.

In an embodiment, the session description is not sent through the first and second network, but reaches the gateway in some other way. For example, the content client may explicitly forward the session description to the gateway. The content client may then forward the session description to the recommender.

The content server may send the session description in response to a request, e.g., from the content client. The content server may also send the session description without a request, e.g., as an announce that content is available.

The network monitor may be integrated with other network monitoring devices, in particular a firewall. The recommender may be comprised in the gateway.

Marking a session description can be done in multiple ways. For example, additional information may be added to the session description indicating which media description contained therein are marked. The additional information may be concatenated to the session description, or inserted in the session description. The session description and additional information may be contained in two separate files, which are both sent from the gateway to the content client. The marking may also be done by modifying the session description in other ways. For example, an order of the media descriptions in the session description may be modified, in particular a marked media description may be moved to a first position in the order, e.g., towards the top of the session description. The number of marked media descriptions may be a predetermined number, in particular it may be 1, or the number may be variable. In an embodiment, it is avoided to mark all of the multiple media descriptions if there is more than one media descriptions present in the session description.

For example, the session description may be marked by adding to the amount of bandwidth that should be used. From this the content client may infer that those media descriptions having a required bandwidth below the added amount are marked.

The recommender may be connected to the network monitor to receive information. For example, the recommender may receive a digital summary of the network monitoring. For example, the recommender may receive a number such as the amount of bandwidth currently available to receive additional content items from the second network into the first network. For example, the recommender may receive a number such as the amount of data, e.g. in kilobytes per second, currently available to receive additional content items from the second network into the first network. The available bandwidth at a link is its unused network capacity.

The recommender is configured to send the marked session description to the content client, e.g., via the gateway. The gateway typically uses the first network for sending the marked session description.

It also a possibility, that the first and second network are only used for sending and receiving content items. Control data such as: requests for a session description, session descriptions, marked session descriptions etc, may be sent over another channel, e.g., a different network, direct communication, using SMS, mobile phone traffic, http web traffic etc. For example, the first and second network may be a cable network suitable for receiving content, while all or part of the control data uses the Internet for communication.

The content client can react to a marked session description in multiple ways. Following the recommendation, e.g., the marked media description, gives some assurance to the user that this content is suitable given the current network conditions.

One possibility is that the content client accepts the marked media description as a recommendation but is otherwise free to disregard the recommendation and choose an unmarked media descriptions in the session description. For example, the content client may display the media description to the user including an indication which one or ones are marked. The user may take the risk and choose a media description which is not marked. Another possibility is that the content client has been configured, e.g., through a preferences menu, to always use a marked description, e.g., the single marked media descriptions. The content client may also be configured to ask the user for a choice, but only from marked media descriptions.

In an embodiment, the network monitor comprises a bandwidth estimator for estimating an amount of bandwidth available in the network for receiving a content item. In an embodiment, the network monitor comprises a bandwidth estimator for estimating an amount of bandwidth in the first and second network available for receiving a content item.

It is a problem that a content client in a first network is not able to directly see the bandwidth demand that the first network makes on the second network. When there are multiple content clients in the first network this problem is particularly acute. A content client may not only consume bandwidth independently from other content clients on the same first network, but also in way that its bandwidth consumption is not visible to the other content clients. For example, in a home network multiple users may be watching a movie, independent from each other, possibly the users do not even know from each others activities. At the gateway, where content is received in the first network from the second network, it is possible to obtain information on the amount of bandwidth the first network is asking from the second network, since at this point multiple content receiving sessions for multiple content clients pass. If the gateway is the only point in the network where network traffic enters the first network from the second network, then the gateway can make a more accurate assessment of the demand that the first network makes on the second network.

This estimated available bandwidth can be used to make a recommendation for content from the multiple media descriptions based on bandwidth. In an embodiment, the multiple media descriptions have respective multiple bandwidth requirements, and the recommender is configured to mark a media description having a bandwidth requirement below the estimated available bandwidth. In this way the content client is informed of which content is considered suitable given the current network conditions.

If the content client is configured to use a marked media description, its user has a reasonable assurance that watching the content will not cause network congestion. Causing network congestion is undesirable. First of all, network congestions may give an unpleasant viewing experience, since packets may be dropped. If the latency of the network connection is too high, the movie may stall frequently to buffer content. There is another reason to avoid network congestion. Other users of the gateway, e.g., other content client, who may already be watching content, are also impacted by the congestions. In known systems, a user of a content client cannot take the other members of his household into account, since he has no information regarding their bandwidth consumption. Unaware of what other people are watching, he may unconcernedly start a high definition content download, thus ruining the viewing experience of other people in the first network. Note, in the known systems, even if a user wants to take the users into account, he is unable to. However, using the distribution system according to the invention, he at least knows that if he diverges from the recommendation of recommender he not only risks a bad viewing experience for himself but also for others on the same network.

As noted above, the content client may be configured to use a media description which is not marked. The content client may also be configured to use a marked media description by default.

The recommender may be configured to mark more conservatively when it receives information from the network monitor that another user is using more than a particular amount bandwidth. This information may indicate that another user is watching content. In this case, network congestion influences more than one content client. Marking more conservatively may be done by reducing the amount of available bandwidth by some percentage, say 10%, for the purpose of selecting the media descriptions for marking.

The available bandwidth can be obtained in different ways. For example, in an embodiment, network traffic going through the gateway between the first network and second network is limited to a maximum bandwidth, e.g. its capacity. The bandwidth estimator comprises a network bandwidth determinator for determining a current bandwidth of network traffic going through the gateway between the first network and second network. The bandwidth estimator is configured for estimating an amount of available bandwidth by subtracting the current bandwidth from the maximum bandwidth.

A router, such as an edge router may also limit the amount of bandwidth that may be used for a particular gateway using traffic shaping. Although the actual capacity of the second network may be higher, effectively, the maximum bandwidth is limited.

The bandwidth estimator may be configured with the maximum bandwidth. The number may be obtained from a network operator, e.g., an operator of the second network. The maximum bandwidth is related to the maximum amount of network traffic that could pass through the gateway in certain situations, e.g., in optimal situations, or in average situations. The maximum bandwidth is a number independent from possible current network traffic. The maximum bandwidth may be obtained by monitoring current used bandwidth and keeping track of the maximum current used bandwidth which occurred in a certain period. The period may be, say, the passed month. The period may also be unrestricted.

In an embodiment, the network monitor is configured to measure an accumulated network traffic going through the gateway between the first and the second network.

By keeping track of the total amount of network traffic going through the gateway in a certain time frame, say each month, the recommender can make recommendations based on this total. Accumulated network traffic may comprise only network traffic going into the first network from the second network, or of the other way round, or of both, etc. In this way it can be avoided to go outside an amount agreed to in a subscription. Some providers have a fair use policy wherein they impose penalties on users who exceed some amount of network traffic. The recommender can recommend content so that the total amount of accumulated network traffic stays below a predetermined amount.

For example, if the accumulated network traffic, e.g., the amount of bytes requested by the first network from the second network is below some predetermined number, the recommender may recommend high definition videos. However, if the accumulated network traffic is equal to or above the predetermined number, the recommender may recommend standard definition video. In this way, the recommender helps to adapt the quality of the video to the remaining amount of bytes from the total amount of bytes which may be requested without incurring some cost. The predetermined number may be chosen as a percentage of the total amount of bytes, say, 75%.

In an embodiment, the recommender is configured to remove in dependency upon the network monitor, one or more of the multiple media descriptions from the session description to obtain the marked session description.

By removing a media description, the gateway can enforce that the content client is unable to choose that option. For example, if the gateway can determine that the currently available bandwidth is insufficient for the required bandwidth of a media description, it may remove that media description. For example, the gateway may remove a specific media description if the available bandwidth time a constant is less than the required bandwidth of the specific media description. For example, the constant may be more than 1, say 1.1, if user is prepared to suffer some network congestion. If the constant is more than 1, only those media descriptions removed with are almost guaranteed to cause network congestion. For example, the constant may be less than 1, say 0.9, to avoid a content client from selecting a content item that may cause network congestion. It may also be left up to the user if he wants to follow a recommendation as contained in a marked session description or not.

Removing of media descriptions may also be used for content filtering. For example, media descriptions referring to content servers who are know to distribute illegal material or who distribute without proper authorization from rights holders may be filtered, i.e., removed by the recommender.

In an embodiment, the content distribution system comprises a router, in particular an edge router, in the second network. The gateway is connected to the content server through the edge router. A network connection between the gateway and the edge router has a network capacity lower than a network capacity of a network connection between the content client and the gateway.

It is not unusual for the second network to comprise one or more bottlenecks, that is, network connections with a lower capacity than the first network. Often one such bottle neck is the connection immediately after the gateway. Since the gateway is connected to this connection, the gateway has a good view of the bandwidth which is achievable on this connection. The bottleneck may also be at different position, e.g., immediately before the gateway, in the first network.

In an embodiment, at least one further content client is connected to the gateway through the first network.

Having a device for to monitoring the network and recommender for making recommendations on the basis of the monitoring is of advantage independent from the number of content clients on the first network. However, if there are multiple content clients on the network, it is only the gateway that has an overview of the total amount of network traffic caused in the second network by the first network or the current bandwidth consumed. Information obtained from the gateway, is therefore likely to be an accurate reflection of network conditions. Using this information gives more accurate recommendations.

In an embodiment, the bandwidth estimator is configured for determining a change in the estimated amount of available bandwidth, and the recommender comprises an updater configured for sending the content client an updated marked session description based on the changed estimated amount of available bandwidth.

A first user who starts watching content, before a second user, may receive a liberal recommendation from the recommender, since the amount of available bandwidth is high. A second user may get a much more conservative recommendation since the first user is already consuming a significant amount of bandwidth. In this situation, the updater can send an update to the first user recommending that he switches to a different media descriptor using less bandwidth. Using updated marked session descriptions enables users who are already watching a movie takes new users into account and share bandwidth more fairly.

A further aspect of the invention concerns a gateway, for use in a content distribution system comprising a content client, the gateway, and a content server, the gateway being connectable to the content client through a first network, the gateway being connectable to the content server through a second network, the gateway comprising a network monitor for monitoring network traffic going through the gateway between the first network and second network, the gateway comprising a receiver for receiving from the content server a session description comprising multiple media descriptions, each one of the multiple media descriptions comprising connection information to enable the content client to receive over the first and second network and through the gateway a content item, the system comprising a recommender configured to mark in dependency upon the network monitor, one or more of the multiple media descriptions in the session description to obtain a marked session description, the recommender being configured to send the marked session description to the content client.

A further aspect of the invention concerns a bandwidth estimator for estimating an amount of bandwidth available in the network for receiving a content item.

A further aspect of the invention concerns a method for distributing content, comprising monitoring network traffic going through a gateway between a first network and a second network, receiving a session description comprising one or more media descriptions, each one of the one or more media descriptions comprising connection information to enable a content client to receive over the first and second network and through the gateway a content item, marking in dependency upon the monitored network traffic, one or more of the multiple media descriptions in the session description to obtain a marked session description, and sending the marked session description to the content client.

The method may be used in a gateway.

A method according to the invention may be implemented on a computer as a computer implemented method, or in dedicated hardware, or in a combination of both.

Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

A content distribution system is provided comprising a content client and a content server connected through a network. The content server is configured to send the content client a session description comprising at least one media description to enable it to receive over the network a content item. The system comprises a network monitor for monitoring network traffic going through the network, and a recommender for marking in dependency upon the network monitor, one or more of the media descriptions in the session description to obtain a marked session description. The marked media description recommends the content client to prefer certain content above others in view of the current network condition. For example, if available bandwidth is low, content is recommended which requires low bandwidth. Network congestion is thereby avoided for all users of the system.

For completeness it is mentioned that U.S. Pat. No. 7,593,686, with title "Method and system for selecting transmission modes for streaming media content to a wireless handset access technology" discloses a known system comprising a wireless handset and a media server. The handset may connect to the media server in order to receive streaming media content. The wireless handset may send the media server one or more indications of the wireless handset's presentation capabilities. In response, the media server may send the wireless handset a list of media content and transmission modes, and the list of media content and transmission modes may be tailored, at least in part, based on the presentation capabilities of the wireless handset. Real-time media content can be streamed to the wireless handset at different transmission modes, each of which may consume a different level of bandwidth.

A user of the wireless handset may then select from the list of media content, and the media server may stream the media content to the wireless handset using the selected transmission mode. The proposed invention allows the user not only to select from a list, but also give him a recommended option which can be displayed in a highlighted manner by the handset thus improving the user experience. High lighting may be done in number of manners, e.g., displaying in a contrasting color, different, font, underlining, etc.

The known system does not comprise a gateway situated in between the wireless handset and the media server. An intermediary point between two points connected through a network provides a better view of the network, than any one of the end points, e.g., the wireless handset and the media server. Although the media server tailors its offering to the mobile handset, it does this on the basis of information received from the wireless handset, not on information from a different entity located at a different place in the network. It is noted that the tailoring is done at the media server, and not at any other location in the network.

The known system does not take the currently available bandwidth, which may change dynamically, into account, but only a static maximum bandwidth.

SDP does not support negotiation but is only a session description format. An SDP session may contain multiple alternatives offered by a server from which a client can choose. For instance, the server offers audio in multiple different audio formats and/or different compression rates. The client who receives the session description may then select a format that he supports. This selection can for instance be provided by means of RTSP setup messages.

For completeness, it is mentioned that RFC 3264, "An Offer/Answer Model with the Session Description Protocol" uses the Session Description Protocol (SDP). In the model, one participant offers the other a description of the desired session from their perspective, and the other participant answers with the desired session from their perspective to arrive at a common view of a multimedia session between them. This model only works if both the client and the server have all the needed information to make an informed decision regarding the media description which is currently the best option. In particular, RFC 3264 does not make use of a third entity in the network different from the content client and the content server which has access to additional information unknown to client and server, such as a network monitor or a recommender, to recommend one of the media descriptions.

BRIEF DESCRIPTION OF THE DRAWINGS

The invention is explained in further detail by way of example and with reference to the accompanying drawings, wherein:

FIG. 3a shows an example session description, FIG. 3b shows an example marked session description.

Throughout the Figures, similar or corresponding features are indicated by same reference numerals.

Figure 1:
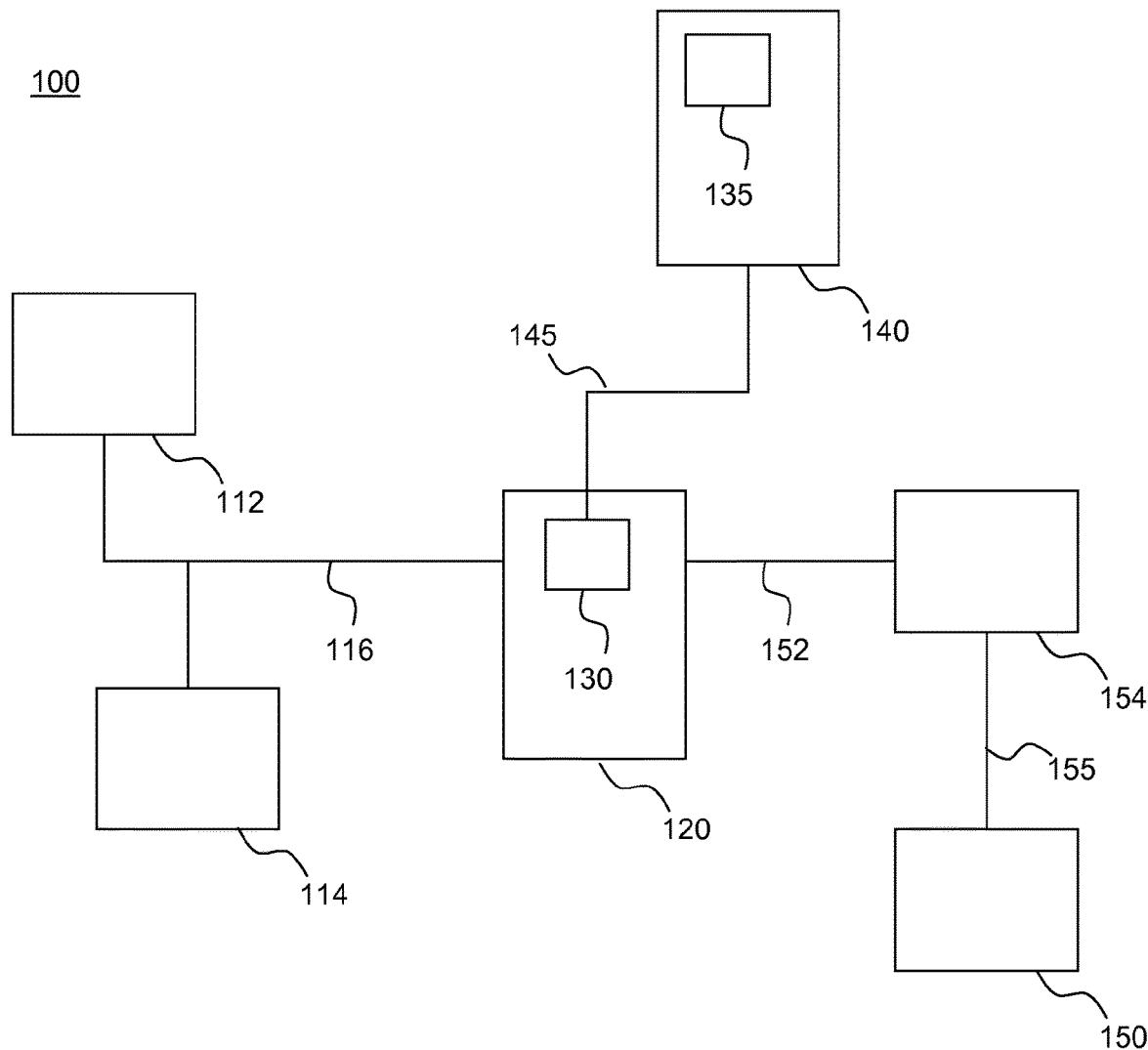
FIG. 1 is a block diagram illustrating a first embodiment of the content distribution system according to the invention.

LIST OF REFERENCE NUMERALS 100 a content distribution system
112 a first content client
114 a second content client
116 a first network connection
120 a gateway
130 a network monitor
135 an updater
140 a recommender
145 a recommender connection
152 a second network connection
154 an edge router
155 a sever connection
150 a content server
210 sending a first request
220 sending a first session description
230 sending a first marked session description
240 sending a second request
250 sending a second session description
260 sending an updated session description
270 sending a second marked session description
300 a session description
310 a first media description
320 a second media description
325 a bandwidth recommendation
350 a marked session description
400 a method for distributing content
410 monitoring network traffic going through a gateway between a first network and a second network 420 receiving a session description comprising multiple media descriptions, each one of the multiple media descriptions comprising connection information to enable a content client to receive over the first and second network and through the gateway a content item 430 marking in dependency upon the monitored network traffic, one or more of the multiple media descriptions in the session description to obtain a marked session description 440 sending the marked session description to the content client 450 receiving over the first and second network and through the gateway a content item corresponding to a marked media description

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates a content distribution system 100 according to the invention with a block diagram. Content distribution system 100 comprises multiple content clients, shown are a first content client 112 and a second content client 114. The system may also be used, with only a single content client. Content distribution system 100 comprises a gateway 120 and a content server 150. The content clients are connected through a first digital network with gateway 120. Of the network connections in the first network one is shown: a first network connection 116, connecting the first content client 112 with gateway 120. A network may comprise multiple connections, in a number of network architectures. Content server 150 is connected with gateway 120 through a second network. The second network is typically larger than the first network.

The first and/or second network is typically a best effort network and does not provide any guarantees regarding the delivery of data packets, such as a certain Quality of Service (QoS) level. Typically, all content clients obtain the same best effort service, and network problems such as throughput, packet loss and high latency are primarily determined by the network load. The first and/or second network may be based on the internet protocol (IP).

Optionally, the second network comprises an edge router 154. The edge router may be operated by an Internet Service provider (ISP). FIG. 1 shows a second network connection 152 from gateway 120 to edge router 154 and a sever connection 155 from edge router 154 to content server 150. Connections which are shown here schematically may comprises multiple connections, routers, etc. The second network may comprise multiple servers, routers, clients, etc. The network between edge router 154 and content server 150 may be referred to as the edge network or the core network.

The network between gateway 120 and edge router 154 may be an access network, i.e., the network which connects the first network, say a home network, with the edge network. The access network often has a limited capacity, e.g., limited to a maximum bandwidth. A typical example is a DSL connection with a capacity of 12 Mbit/s. This capacity allows for the distribution of, for instance, one 8 Mbit/s IPTV stream from the Video Server in the edge network to a Video Client in the home network.

Second network connection 152 typically has a lower bandwidth than first network connection 116 and/or server connection 155. Typically, when a content client receives content from content server 150 then the maximum through put, the maximum bandwidth, is limited by the maximum bandwidth of second network connection 152. The network, i.e., the first and/or second network, may comprise further or other bottlenecks. Second network connection 152 is also referred to as the access link.

Multiple users located in the same first network may want to watch different IPTV streams simultaneously. The access link capacity might be too small to support multiple concurrent video services. For example, the delivery of two 8 Mbit/s video streams over a 12 Mbit access link to two content clients will lead to problems in the playback of these streams. In this case both content clients will receive impaired video streams.

If the network load from the second network on edge router 154 increases beyond the capacity of second network connection 152, then edge router 154 will typically drop network packets. This will lead to impairments in any video stream which is going over second network connection 152, resulting in degraded quality for both users.

Gateway 120 comprises a network monitor 130 for monitoring network traffic going between the first network and the second network. Network monitor 130 may be restricted to the monitoring of network traffic going into the first network, e.g., from the second network. If most circumstances this will give good results, since typically when there is a bandwidth problem it would be caused by the second network generating too much traffic towards the first network. Monitor 130 may, alternatively monitor network traffic going out of the first network. Monitor 130 may monitor all traffic going through the gateway.

Content distribution system 100 further comprises a recommender 140. The recommender is configured to receive information from network monitor 130 over a recommender connection 145. Recommender 140 may be positioned at various places in the network, e.g., in gateway 120, content server 150 or in a content client.

Figure 2:
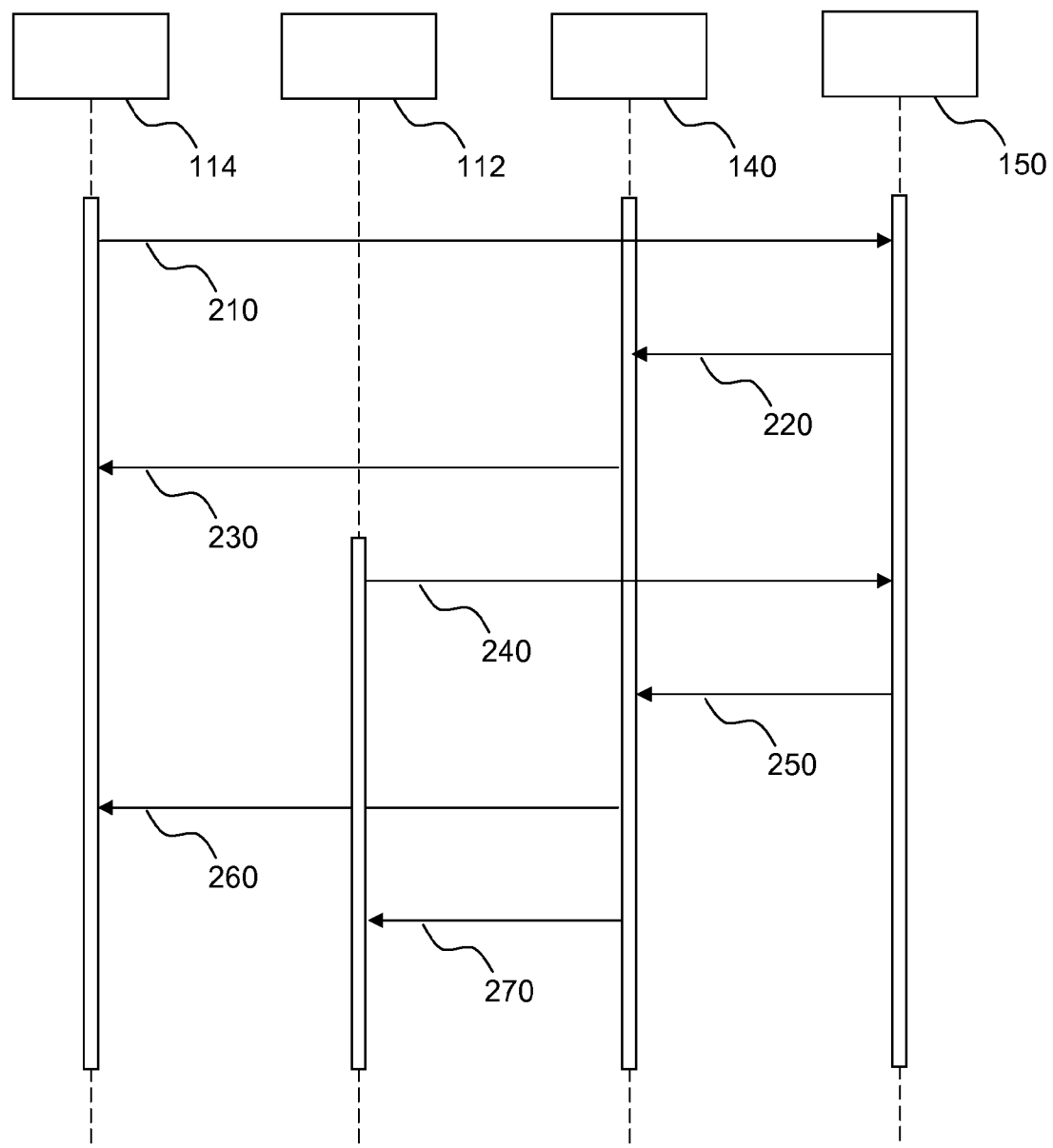
FIG. 2 is a sequence diagram illustrating a possible exchange of messages according to the invention.

Use of content distribution system 100 is illustrated using the sequence diagram shown in FIG. 2. The progress of time is illustrated in FIG. 2, as going from the top of the figure to the bottom. We will suppose that second content client 114 is the first to request content from content server 150, and to use second network connection 152. Second content client 114 sends a first request 210 to content server 150. Content server 150 responds by sending a first session description 220. As the first session description passes through the network, it eventually arrives at gateway 120. Since the network is at this point mostly idle, recommender 140 may recommend the highest quality media description contained in the first session description. Gateway 120 sends a first marked session description 230 to second content client 114. Second content client 114, possibly followed by one or more other content clients in the first network starts receiving content from a content server (not shown in FIG. 2), such as content server 150. These content receiving sessions consume part of the bandwidth capacity of second network connection 152. For example, a user of second content client 114 may be watching a High Definition (HD) IPTV stream on second content client 114, e.g., a PC. The content is received in the first network through gateway 120. The network traffic caused by the received content is monitored by network monitor 130. For example, network monitor 130 counts the number of bits that flows into the first network per second, i.e., the current used bandwidth. Network monitor 130 may also keep track of the highest maximum used bandwidth which occurred in the past month, or ever, e.g., using a moving average calculation or some other calculation. The highest maximum used bandwidth may be used as a maximum bandwidth, i.e., an estimate for the capacity of the network, in particular of connection 152. It may be then assumed that the network traffic that may go through the gateway between the first network and second network is limited to the maximum bandwidth.

Network monitor 130 may determine the current available bandwidth by subtracting the current used bandwidth from the maximum bandwidth. Recommender 140 receives current available bandwidth from network monitor 130 over recommender connection 145. Alternatively, recommender 140 may also receive the current used bandwidth and the maximum bandwidth and calculate the current available bandwidth from this information.

At some point content server 150 sends first content client 112 a second session description 250. The second session description is intercepted at gateway 120. Content server 150 may have been triggered to send the second session description by a request which was previously received from first content client 112, e.g., over the network. For example, first content client 112 has previously sent a second request 240 to content server 150. For example, a user of first content client 112 selects, e.g., through an EPG, a movie for first content client 112, e.g., a Set Top Box (STB). First content client 112 queries a content server 150 for a description of the content. The content server replies with at least a session description message, for instance an RFC 4566 Session Description Protocol (SDP) message.

The SDP message may provide meta-data about the session, e.g., the author, the title, contact information etc. The SDP message may provide different media formats in which the selected content item can be delivered, e.g., which transport protocols, video format, audio format etc. For example, it may contain descriptors indicating a multi layer SVC stream, say a 5 layer SVC stream (see below).

Session description messages can be offered in various formats, for instance plain text, xml, or SDP format and can be transmitted from content server 150 to first content client 112 in several manners, e.g., using the RTSP protocol, SIP, HTTP, SAP announcements, etc.

Content server 150 may also send first content client 112 the session description of its own accord without a request from a content client, for example to announce the availability of new or updated content. In this case, there is no sending of the second request 240. The session description may be broadcasted by content server 150 to multiple content clients, e.g., the content clients connected to gateway 120.

The session description sent from content server 150 is transmitted over server connection 155 to edge router 154 and from there to gateway 120 over second network connection 152. Gateway 120 intercepts the session description, for example, using deep packed inspection. Gateway 120 transmits the intercepted session description to recommender 140 over recommender connection 145.

Recommender 140 inspects the session description that was received from content server 150. It determines media descriptions which are embedded in the session description. Recommender 140 also tries to determine for each media description what bandwidth is required. The required bandwidth may be included in the session description. The required bandwidth may also be determined on the basis of the intended use of the content. For example, from an attribute of the content, such as resolution, frames per second, color depth, etc, the required bandwidth may also be determined or estimated. If recommender 140 fails to establish a required bandwidth for a media description, recommender 140 may ignore it, not mark it, or even remove the media description from the session description.

The bandwidth requirement may also be determined on the basis of a history of received content. For example, the recommender may store a history of received media descriptions which were used by a content client. The recommender further stores the amount of bandwidth the media description required. When the required bandwidth is needed for a received media description, it can be determined by the recommender if it is equal to a stored media description, and if so the stored amount of used bandwidth may be used as an estimate for the requirement of the currently received media description.

For each media description, network monitor 130 may determine from its required bandwidth and the available bandwidth if the network is currently capable of transmitting the content from content server 150 to first content client 112 over the second and first network, without causing network congestion, i.e., network monitor 130 verifies if the required bandwidth is less than the available bandwidth. Network monitor 130 may also take a safety margin into account. For example, by verifying that the required bandwidth is less than the available bandwidth times a certain number, say, 0.9.

Recommender 140 marks media descriptions in the session description according to a marking scheme. For example, recommender 140 may mark any media description whose required bandwidth is below the current available bandwidth. For example, recommender 140 may mark only one media description, namely the media description with the highest bandwidth requirement, yet whose bandwidth requirement is below the current available bandwidth. In case none of the media description has a required bandwidth which is below the current available bandwidth, recommender 140 may mark none of the media descriptions, or instead the media description with the lowest required bandwidth. Many alternative marking schemes are possible.

Gateway 120 may receive from recommender 140 the recommended media descriptions in the session description and mark the recommended session descriptions accordingly, and transmit it to first content client 112 through the first network.

Gateway 120 may receive from recommender 140 the marked session description. Gateway 120 can transmits it to first content client 112 through the first network. Alternatively, the marked session description is sent by the recommender to the client without using the gateway.

Recommender 140 uses network monitor 130, e.g. for monitoring of the access network traffic and the access link capacity to determine what video services can be supported. Network monitor 130 may operate implicitly, e.g. as a forced or transparent network monitor 130, wherein all session establishment related information passes network monitor 130. Network monitor 130 may operate explicitly, e.g., the content clients connect to content server 150 via network monitor 130. As session information passes through the network monitor 130, the network monitor 130 can maintain all current sessions and thus keep track of the bandwidth usage of different sessions.

The network monitor may be, but is not necessarily, comprised in the gateway. The network monitor may receive network information from the gateway.

Recommender 140 analyzes the session descriptions to determine the bandwidth requirements for the session and the structure of the session, e.g., how the respective layers are delivered. Recommender 140 may add recommendations to the session description regarding the amount of bandwidth that should be used.

A recommendation, i.e., a marking of the session description, regarding the amount of bandwidth that should be used can be in several forms. For example, one or more of the media descriptions may be marked directly by adding a reference to the marked media description to the session description. Marking of the session description may also comprise adding the recommended amount of bandwidth, e.g., the available amount of bandwidth to the session descriptions, adding the recommended subset of SVC video layers. In case a session description offers content in multiple audio and/or video codecs, then media descriptions may be marked by referring to the recommended video and/or audio codec. In case a video is offered in low/mid/high setting, then media descriptions may be marked by referring to a recommended video preset.

Gateway 120 sends the second marked session description 270 to first content client 112. After first content client 112 has received the marked session description he has the option of following the recommendation from recommender 140. If first content client 112 follows the recommendation from recommender 140, there is a reasonable expectation that the additional network traffic by watching a marked media description will not cause network congestion, e.g., network congestion on second network connection 152.

If recommender 140 determines that a different content client on the first network is using a lot of bandwidth, say second content client 114, which blocks first content client 112 from obtaining reasonable quality content without causing network congestion, then recommender 140 may send second content client 114 an updated marked session description 260. For example, recommender 140 may optionally comprise an updater 135 for determining if changed bandwidth condition, e.g., due to changed, e.g., increased, demand from the first network or due to a change in supply from the second network, merits sending an update. The updated marked session description gives a new recommendation, adapted to a different available bandwidth. If second content client 114 follows the recommendation, then both first content client 112 and second content client 114 may be able to watch reasonable quality content.

Similarly, when the available bandwidth increases, e.g., because some of the content clients stop watching the content, then recommender 140 may send an updated marked session description to indicate that the client may switch to content with a higher required bandwidth without additional risk of causing network congestion. First content client 112 and/or second content client 114 may be configured to follow an updated marked session description automatically.

Updated marked session descriptions are particular advantageous when combined with scalable video coding (SVC, further described below). SVC allows for the dynamic delivery of enhancement layers, allowing graceful degradation or improvement of the video service, without playback issues. A client who watches content encoded with SVC may switch to a media description with a different number of layers, without experiencing a glitch in the playback.

It is of advantage to combine updated marked session descriptions with the possibility to remove media description with a bandwidth requirement. The content client may be configured to stop receiving the content associated with the removed media description. The recommender can thus arrange the bandwidth consumption in the entire first network in a more efficient manner.

A content client may periodically query recommender 140, using a polling or call-back mechanism to check for updates. Recommender 140 may announce the updated recommendations, for instance via an RTSP announce messages or an UPnP event.

By adding bandwidth recommendations by marking a session description, new sessions can be setup without causing network congestion to occur, which would affect both the user initiating the session and other users already in sessions. Users can obtain network resources in an unmanaged network without a trial and error approach. If multiple users are watching a content stream then a trial and error approach will negatively impact all users.

Gateway 120, in particular network monitor 130 may also monitor request for session descriptions coming from the first network and going to the second network, e.g., request 210 or 240. A request for a session description may comprise information on capabilities of the content client. This information may be used in addition to other information, e.g. available bandwidth information. For example, if from the request it can be determined that the content client has a client bandwidth maximum, the maximum amount of bandwidth that can be used by the content client, the recommender can avoid recommending content with a higher bandwidth requirement. For example, a device capable of displaying SD video had a corresponding client bandwidth maximum. The recommender can recommend against HD content which has a bandwidth requirement above the client bandwidth maximum. Gateway 120, in particular network monitor 130, may store client capabilities in a storage medium, for future use.

Message 260 could be omitted altogether; In that case, client 112 receives in message 270 a recommendation to use a low bandwidth version of the content.

In an embodiment, messages 260 and 270 may be as follows. Message 260 request client 114 to voluntary switch to content requiring less bandwidth than client 114 is currently consuming. Client 114 may or may not accept this recommendation. Message 270 comprises a recommendation based on the currently available amount of bandwidth, assuming client 114 does not switch. Note that there is no need for gateway 120 to wait for a reply to message 260 before sending message 270. Message 270 may comprise an explicit indication for client 112 that an updated marked session description has been sent to a different content client to free up bandwidth. Message 270 may be implicitly so interpreted by client 112. Client 112 then has the option of connecting for content with a lower bandwidth requirement, and poll gateway 120, in particular recommender 140, after some predetermined time period, e.g., after 10 seconds, if the available bandwidth has increased. If so, content client 112 may receive an updated marked session description (not shown in FIG. 2). Client 112's updated marked session description may also be sent on the initiative of gateway 120, etc. This solution is well suited for unmanaged networks. It is compatible with implementations, e.g., network software, which is not adapted for regulating bandwidth in order to obtain a guaranteed quality of service. Instead, the users can voluntary distribute the available bandwidth among them selves on a voluntary basis. No changes are needed to the low-level network infrastructure in the first network.

The order of messages 260 and 270 may be interchanged, i.e., message 270 is sent first, recommending a low bandwidth content version to client 112, after which an updated marked session description is sent to client 114. If the network monitor notes that more bandwidth is available, either because client 114 followed the updated recommendation or for some other reason, an updated marked session description may be sent to client 112, recommending a higher bandwidth recommendation.

A service running on a content client may not follow a recommendation in a marked session description. As a result, congestion in the network may occur, leading to a reduction in service experience. This could also be the case with other types of applications competing for traffic, such as bandwidth-hogging applications such as peer-to peer based data transfers, e.g. Bittorrent. To address this problem, the invention could be combined with other approaches to prevent some applications of using too many resources, in particular network resources such as available bandwidth. For example, resource allocation and scheduling techniques may be combined with the invention, including known techniques such as: Fair queuing, Weighted queuing, Priority queuing and Class based queuing.

Services adhering to the bandwidth recommendations may be assigned to a higher priority traffic class while other traffic could automatically be assigned to a lower priority class. For example, a service running on a content client which does not recognize or ignores the recommendations, e.g. the markings, in the session description may be placed in lower priority class.

For example, for video services a guaranteed bandwidth of 15 mbit/s may be allocated, while for other traffic only a guaranteed bandwidth of 3 mbit/s is allocated. All video services combined can use 15 mbit/s which a recommender, e.g. in a proxy or gateway will help to divide. All other services may use at least use 3 mbit/s and optionally more (namely the portion of the bandwidth allocated for the video service which is currently not used or needed by video services).

In this way, "compliant services", i.e., services who recognize and follow bandwidth recommendation only compete for bandwidth with other compliant services.

Below further details and/or embodiments and/or parts thereof are discussed.

Multiple media descriptions having different bandwidth requirements may be obtained using Scalable Video Coding (SVC). A video encoded with scalable video coding comprises multiple different layers, which may be incrementally combined to provide progressive enhancements. A scalable video may comprise a base layer, providing a basic representation of the video signal and optionally comprises one or more enhancement layers, which enhance the base layer to provide a higher video resolution, frame rate and/or video quality. SVC video allows for servicing video to different kind of end devices, which have their respective constraints: screen size, processing power, etc. SVC video layers can be transmitted independently, allowing for flexible delivery of video streams.

One possibility is to refer in the media description to the same SVC encoded video, wherein different media descriptions require a different number of enhancement layers. Although each media description refers to the same video, they have different bandwidth requirements since they refer to a different number of layers. SVC is described more fully in ITU-T recommendation h.264: Advanced video coding for generic audiovisual services (03/2009).

A further possibility is for content server 150 to offer multiple versions of the same video stream in different bit rates. Connection information of different video streams may be recorded in different media descriptions. A lower bit rate version of a video stream may be obtained by using less bytes to describe the images, e.g., using a different compression factor or by transcoding it to a lower resolution or by some other suitable method.

Estimation of the (current) available bandwidth may be done in a variety of ways. For example, gateway 120 may comprise an access link capacity determinator for determining the maximum capacity of the access link, a used network bandwidth determinator for monitoring the current throughput of the access link and an available bandwidth estimator for estimating the amount of available bandwidth based on the access link capacity and the current throughput level.

To determine the effective access link capacity (the available bandwidth), several mechanisms are possible.

gateway 120 may have access to management information, which can be retrieved for instance via SNMP of TR-69.

network monitor 130 may periodically poll the current traffic rate. For example, polling edge router 154, e.g., using SNMP, to retrieve the current traffic rate and the maximum reported value. Using a weighed average function the network monitor 130 can establish a mean value of the available access link capacity.

network monitor 130 can periodically start a test file transfer with a server, e.g. a web server, e.g., content server 150, to determine the maximum bandwidth.

Bandwidth estimation tools are given in Strauss J. et al. "A Measurement Study of Available Bandwidth Estimation Tools".

Network monitor 130 could monitor the peak levels of the throughput of the connection. For example, if the throughput never exceeds 20 Mbit/s, this value could be taken as an upper limit for the access link capacity.

Monitoring of the currently used bandwidth, in particular, monitoring how much of second network connection 152's bandwidth is currently used, can be done in a number of ways. Network data traffic from the first network to the access network, and vice versa, passes gateway 120. Gateway 120 is typically capable of determining the amount of traffic passing from the first network to the access link, which is often the low bandwidth connection and vice versa. Alternatively, this information can be obtained from a separate router, e.g., edge router 154, via a software function call or by means of network management protocols such as SNMP (RFC 1157, RFC 2578 and RFC 2571).

Alternatively the network monitor 130 can keep track of all currently ongoing sessions and their bandwidth requirements. The amount of bandwidth used could then be determined by adding the bandwidth requirements of all ongoing sessions.

The amount of available bandwidth may also be estimated based on capacity of second network connection 152 and the current throughput level. The amount of available bandwidth may be estimated based on the total access link capacity and the current bandwidth usage level, e.g., by subtracting the used bandwidth from the total bandwidth to obtain the available bandwidth.

Based on this availability, a recommendation for a new session can then be given, the recommended bandwidth being at most the available bandwidth. Typically, a margin of 10-20% is used to account for fluctuations in the network traffic.

Gateway 120 may be an intermediary who acts as both a server and a content client for the purpose of retrieving resources or resource manifestations on behalf of other content clients. Gateway 120 may be or comprise a proxy. In an embodiment, all communication between the user and a content server is mediated by the gateway 120, allowing the recommender 140 to add recommendations to session description messages transmitted between the users and the content servers.

The network monitor 130 can detect new sessions implicitly or explicitly.

Using implicit session detection, network monitor 130 detects new sessions by intercepting the session establishment messages from a content client to a content server and vice versa. This interception may occur in gateway 120. Gateway 120 may intercept session establishment messages by analyzing packets flowing through it. Session establishment packets can be detected and selected by means of, but not limited to, the following criteria.

- Protocol port number: Session establishment protocols such as RTSP, SIP, HTTP and RTMP typically use a fixed destination or source port. For instance RTSP messages are typically send via port 554 or 8554, SIP messages via port 5060 and 5061. HTTP and RTMP messages typically use port 80
- Network addresses. The network monitor 130 may have access to a list of the addresses of well know content servers. This list could be configured by the user, received from a web service or composed from previous sessions for with the network monitor 130 was used. A Video Service may intercept all traffic from or to these addresses.
- Deep packet inspection, e.g., scanning all packets (header+content) for information matching predefined session establishment identifiers.

Network monitor 130 may also detect new sessions using explicit session detection. In this mode a content client, e.g., first content client 112, transmits new session setup requests via the gateway 120. For example, the content client explicitly transmits new requests to the gateway 120, which can then forward the message on behalf of the client. A message from the content server 150 will be sent to gateway 120, which will forward the message to the content client.

Determining bandwidth requirements may be done in a number of ways. For example, when network monitor 130 detects a new session request, the network monitor 130 or recommender 140 analyzes the session description in the session request (or response). The session description is stored in a message format such as the Session Description Protocol (RFC 4566). SDP messages contain meta-information about the session, e.g., multimedia session, which is being setup: a description of the session, the transport protocols to transfer the RTP data; network addressing; audio and video formats that can be used; bandwidth requirements, etc. The network monitor 130 or recommender 140 parses the session description messages to detect parameters indicating the bandwidth requirements for a session. The session description messages for instance could contain:

- bandwidth requirements for a session;
- various alternatives for sessions, including alternative bandwidth requirements (for instance a video is offered in two video formats)
- Layer information, with bandwidth requirements per layer. An example would be a Scalable Video Coding (SVC) session with a base layer and one or more enhancement layers Below we provide an example of a recommendation. Based on the determined bandwidth requirements the recommender 140 determines what session alternatives are possible. Consider the following, first example:

The access links capacity (Bandwidth total)=6 Mbit/s

The current bandwidth usage (Bandwidth used)=3 Mbit/s

Available bandwidth is determined as the difference 6−3=3 Mbit/s

The session offer from content server 150 contains two alternatives, e.g., two media descriptions:

a High Definition video stream requiring 4 Mbit/s a Standard Definition video stream requiring 2 Mbit/s Mbit/s stands for Megabit per second.

The recommender 140 determines that the High Definition session will result in network issues, since the required bandwidth (4 Mbit/s) is higher than the available bandwidth (2 Mbit/s) network monitor 130 adds a bandwidth recommendation for the Standard Definition session to the session description being sent to the content client. The bandwidth recommendation may be expressed by adding information to the session description representing that the recommended bandwidth is 3 Mbit/s. The bandwidth recommendation may be expressed by adding information to the session description representing an indication of the standard definition video stream.

A bandwidth recommendation of 0 may signal a recommendation that the network is too unreliable or has too low available bandwidth for any meaningful content transmission.

Consider the following, second example:

The access links capacity=6 Mbit/s

The current bandwidth usage=3 Mbit/s

Available bandwidth is determined as the difference 6−3=3 Mbit/s

The session offer from a content server contains a Scalable Video Coding session with the following parameters:

the base layer requires 1 Mbit/s a first enhancement layer requires 2 Mbit/s a second enhancement layer requires an additional 2 Mbit/s The recommender 140 determines that the base layer and first enhancement layer can be transmitted given the current network conditions adds a bandwidth recommendation for the base layer and the first enhancement layer. For example, recommender 140 adds information representing 'total 2 layers, i.e. one base and one enhancement layer'. For example, recommender 140 adds information indicating the first enhancement layer, the content client inferring that the base layer would also be needed.

Below an example of bandwidth recommendation using the Session Description Protocol is given.

Consider a streaming audio session where the server offers the audio in two variants: an audio stream with a bit rate of 32 kbit/s and an audio stream with a bit rate of 64 kbit/s. The current available access link bandwidth is 40 kbit/s. content server 150 transmits the SDP session description shown in FIG. 3*a* to first content client 112. On its way to first content client 112, the session description arrives at gateway 120 where it is intercepted.

The fields used in the session description are explained in RFC 4566. In particular the fields indicated with a '=' are explained in Section 5 thereof. Connection information is provided with the line starting with 'c='

A line beginning with 'm=' starts a new media description. The session description shown in FIG. 3*a* has two media descriptions, indicated with 310 and 320. The lines starting with 'b=' are bandwidth information lines. Each shown media description has a bandwidth information line. Recommender 140 may determine the required bandwidth of a media description from the bandwidth information lines.

This message is parsed by recommender 140, which identifies the two audio streams and the bandwidth requirements given by the b=AS:32 and b=AS:64 attributes.

Supposing, as an example, that the available bandwidth in the access link is limited to 40 kbit/s, recommender 140 will recommend the first audio stream. This recommendation may be given by the following session attribute:

a=recomsessionbw:32

This attribute is added to the SDP description to obtain a marked session description which is then forwarded to the content client. The marked session description is shown in FIG. 3b. Apart from the added line, the marked session description is the same as the session description received in gateway 120 from content server 150. The added line is indicated with reference number 325.

First content client 112 parses the marked SDP file and detects the provided bandwidth recommendation (32 kbit/s). Based on this information first content client 112 may decide to use the media description 310. First content client 112 may also be configured to use the indicated media description 310 by default. Indicating media description with a bandwidth recommendation number as above, is particularly efficient is multiple media descriptions have a bandwidth requirement below the available bandwidth.

Instead of providing a recommended bandwidth number, recommender 140 may also identify the media stream that fulfils the bandwidth constraints, by means of the RTP payload type number; Line 325 in FIG. 3b may be replaced by the following:

a=recomsessionid:96

First content client 112 parses this marked SDP description and see the identifier for the recommended media stream (the first audio stream). Identifying a particular media description, e.g., by reference to a reference number of the media description, is particularly efficient if one or a few media description are to be singled out. For example, if multiple media descriptions have a bandwidth requirement below the available bandwidth, but one is of a higher quality than the other, then it may be identified by reference.

The recommender may also remove an unmarked media description from the session description. For example, media description 320 could be removed from the session description.

If the available bandwidth in the access link were limited to 80 kbit/s, recommender 140 may recommend the second audio stream, e.g., with the line a=recomsessionbw:64. Marking the second audio stream (320) may also be done by moving the marked stream to the top of the media descriptions, in this case, by reverting the order of 310 and 320 in the session description.

These are mere example implementations of how the recommendation could be signalled in an SDP description and should not be seen as the only methods to signal bandwidth recommendations in an SDP description.

In a further embodiment, edge router 154 may assume the role of gateway for the purpose of the invention. Edge router 154 connects two networks with each other, routing traffic between the one network and the other. Edge router 154 may comprise network monitor 130, and/or recommender 140.

It is noted that the invention may also be used without a gateway. For example, in a content distribution system comprising a content client and a content server, the content client and the content server being connected through a network, the content server being configured to send to the content client a session description comprising one or multiple media descriptions, each one of the media descriptions comprising connection information to enable the content client to receive over the network a content item, wherein the system comprises a bandwidth estimator for estimating an amount of available bandwidth in the first and second network available for receiving a further content item, the system comprises a recommender configured to mark in dependency upon the amount of available bandwidth, one or more of the multiple media descriptions in the session description to obtain a marked session description, the recommender being configured to send the marked session description to the content client. This system may be combined with suitable features of content distribution system comprising a gateway.

Figure 4:
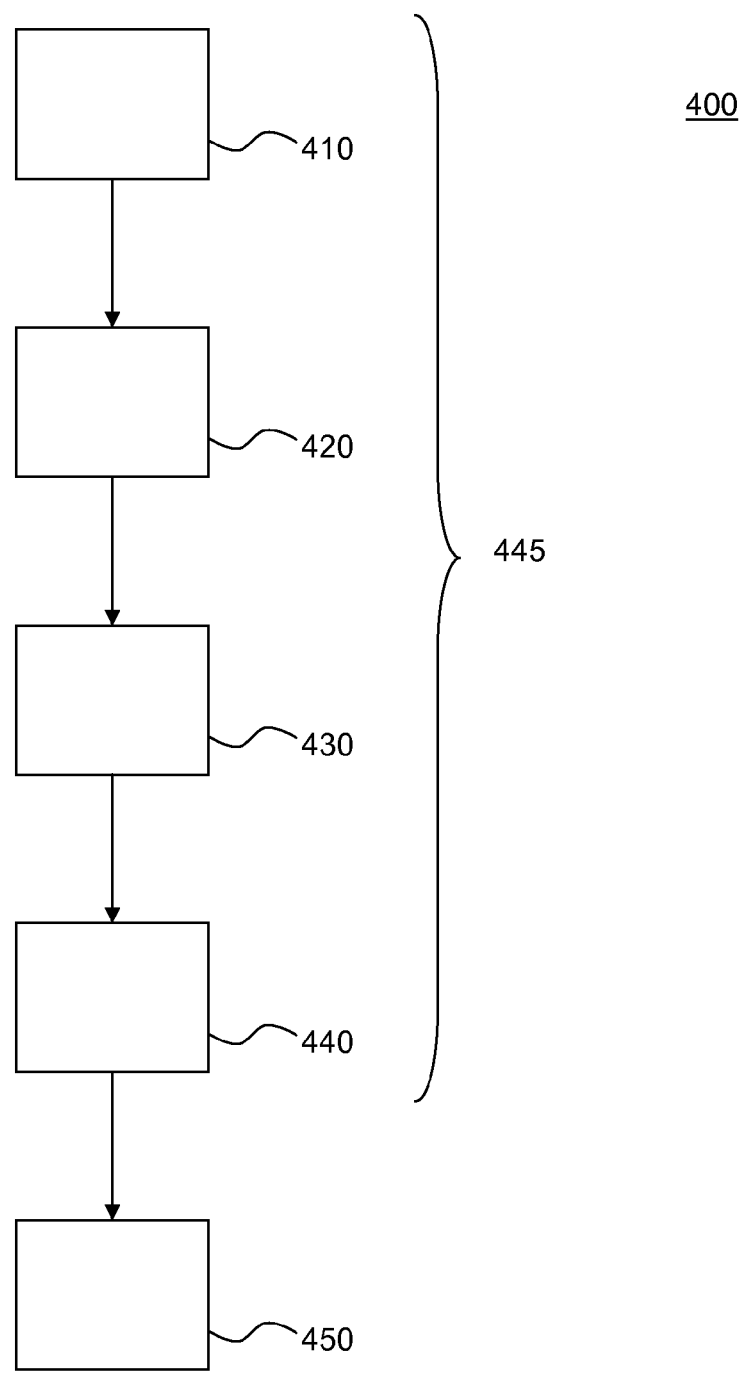
FIG. 4 is a flow chart illustrating a method according to the invention.

FIG. 4 illustrates using a flow chart a method 400 according to the invention. The part of the flowchart 400 indicated with reference number 445 may be executed in a gateway and/or recommender, e.g., gateway 120 and recommender 140. Flowchart element 410 illustrates monitoring network traffic going through a gateway between a first network and a second network. Flowchart element 420 illustrates receiving a session description comprising multiple media descriptions, each one of the multiple media descriptions comprising connection information to enable a content client to receive over the first and second network and through the gateway a content item. Flowchart element 430 illustrates marking in dependency upon the monitored network traffic, one or more of the multiple media descriptions in the session description to obtain a marked session description. Flowchart element 440 illustrates sending the marked session description to the content client. Flowchart element 450 illustrates receiving over the first and second network and through the gateway a content item corresponding to a marked media description. Receiving a content item corresponding to a marked media description may be done in a content client, e.g., first content client 112, and is enabled by the information in a marked media description.

The session description received in flowchart element 420 may also comprise a single media description. In that case the recommender can recommend in favor or against using the single media description.

Many different ways of executing the method are possible, as will be apparent to a person skilled in the art. For example, the order of the steps can be varied or some steps may be executed in parallel. Moreover, in between steps other method steps may be inserted either. The inserted steps may represents refinements of the method such as described herein, or may be unrelated to the method. For example, monitoring network traffic may be done in parallel to any one of the other method steps. Moreover, a given step may not have finished completely before a next step is started.

A method according to the invention may be executed using software, which comprises instructions for causing a processor system to perform method 400. Software may only include steps taken by a gateway device, or only those taken by a content client. The software may be stored in a suitable storage medium, such as a hard disk, a floppy, a memory, etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A content distribution system comprising one or more network devices, including a content client and a content server,
wherein each of the one or more network devices comprises a processor and memory storing instructions that, when executed by the processor, causes the one or more network devices to carry out one or more functionalities;
wherein the content client and content server are connected through a network;
wherein the content client is configured to send a request for a content item to the content server;
wherein the content server is configured to send to the content client a session description comprising at least one media description relating to a respective version of the content item, each one of the at least one media description comprising connection information and a bandwidth requirement to enable the content client to receive over the network the respective version of the content item;
wherein the one or more functionalities include a network monitor functionality for monitoring a current amount of network traffic going through the network;
wherein the network monitor functionality comprises a bandwidth estimator functionality for estimating an amount of bandwidth available in the network for receiving the content item by deducting the current amount of traffic going through the network from a maximum available bandwidth; and
wherein the one or more functionalities further include a recommender functionality configured to provide, in a file separate from the session description, information indicating the amount of bandwidth available in the network for receiving the content item to the content client; and
wherein the content client is configured to select one of the at least one media descriptions to receive the respective version of the content item over the network based on the bandwidth requirement of the one of the at least one media description and the information indicating the amount of bandwidth available in the network for receiving the content item.

2. The content distribution system according to claim 1, wherein
the bandwidth estimator functionality is configured for determining a change in the estimated amount of available bandwidth; and
the recommender functionality further comprises an updater functionality configured for sending the content client updated information indicating the amount of bandwidth available in the network for receiving the content item based on the changed estimated amount of available bandwidth.

3. The content distribution system according to claim 1, further comprising a gateway,
wherein the network comprises a first and a second network;
wherein the content client and the gateway are connected through the first network, and the gateway and the content server are connected through the second network;
wherein each one of the connection information enables the content client to receive over the first and second network and through the gateway the content item;
and wherein the one or more functionalities carried out by the gateway include the network monitor functionality for monitoring network traffic going through the gateway between the first network and second network.

4. The content distribution system according to claim 3, wherein network traffic going through the gateway between the first network and the second network is limited to a maximum bandwidth;

the bandwidth estimator functionality comprises a network bandwidth determinator functionality for determining a current bandwidth of network traffic going through the gateway between the first network and second network; and the bandwidth estimator functionality is further configured for estimating an amount of available bandwidth by subtracting the current bandwidth from the maximum bandwidth.

5. The content distribution system according to claim 1, wherein the session description comprises multiple media descriptions.

6. A method for distributing content, the method comprising:

a content client sending a request for a content item to a content server through a network;

at a monitor device of a network, monitoring a current amount of network traffic going through the network;

receiving a session description relating to a respective version of the content item comprising at least one media description, each one of the at least one media description comprising connection information and a bandwidth requirement to enable the content client to receive over the network the respective version of the content item;

estimating an amount of bandwidth available in the network for receiving the content item by deducting the current amount of traffic going through the network from a maximum available bandwidth; and providing, in a file separate from the session description, information indicating the amount of bandwidth available in the network for receiving the content item to the content client, wherein the content client is configured to select one of the at least one media descriptions to receive the respective version of the content item over the network based on the bandwidth requirement of the one of the at least one media description and the information indicating the amount of bandwidth available in the network for receiving the content item.

7. A non-transient computer-readable medium having instructions stored thereon which, when executed by one or more processors of a content distribution system, cause the content distribution system to carry out operations including:

a content client sending a request for a content item to a content server through a network;

at a monitor device of a network, monitoring a current amount of network traffic going through the network;

receiving a session description relating to a respective version of the content item comprising at least one media description, each one of the at least one media description comprising connection information and a bandwidth requirement to enable the content client to receive over the network the respective version of the content item;

estimating an amount of bandwidth available in the network for receiving the content item by deducting the amount of traffic going through the network from a maximum available bandwidth; and providing, in a file separate from the session description, information indicating the amount of bandwidth available in the network for receiving the content item to the content client, wherein the content client is configured to select one of the at least one media descriptions to receive the respective version of the content item over the network based on the bandwidth requirement of the one of the at least one media description and the information indicating the amount of bandwidth available in the network for receiving the content item.

* * * * *